US008358423B2

(12) United States Patent
Funken et al.

(10) Patent No.: US 8,358,423 B2
(45) Date of Patent: Jan. 22, 2013

(54) CONTACTLESS MEASUREMENT OF AN OFFSET OF THE FUNCTIONAL COMPONENTS OF A TRAVEL PATH OF A MAGNETIC LEVITATION RAILWAY

(75) Inventors: Peter Funken, Frechen (DE); Christian Rosin, Reichling (DE); Wilhelm Engst, Köln (DE)

(73) Assignee: Draka Industrial Cable GmbH, Wuppertal (DE)

( * ) Notice: Subject to any disclaimer, the term of this patent is extended or adjusted under 35 U.S.C. 154(b) by 320 days.

(21) Appl. No.: 12/937,268

(22) PCT Filed: Apr. 10, 2008

(86) PCT No.: PCT/EP2008/002807
§ 371 (c)(1),
(2), (4) Date: Oct. 10, 2010

(87) PCT Pub. No.: WO2009/124565
PCT Pub. Date: Oct. 15, 2009

(65) Prior Publication Data
US 2011/0026013 A1 Feb. 3, 2011

(51) Int. Cl.
*G01B 11/14* (2006.01)
(52) U.S. Cl. .......................... 356/623; 358/614; 358/616
(58) Field of Classification Search ........... 356/600–640
See application file for complete search history.

(56) References Cited

U.S. PATENT DOCUMENTS

| 3,937,148 A * | 2/1976 | Simpson ..................... 104/283 |
| 4,690,066 A * | 9/1987 | Morishita et al. ............. 104/282 |
| 4,742,778 A * | 5/1988 | Morishita et al. ............. 104/284 |
| 6,674,878 B2 * | 1/2004 | Retterath et al. .............. 382/104 |
| 2003/0080192 A1* | 5/2003 | Tsikos et al. .............. 235/462.14 |
| 2003/0085281 A1* | 5/2003 | Knowles et al. .............. 235/454 |
| 2003/0140509 A1 | 7/2003 | Casagrande |

FOREIGN PATENT DOCUMENTS

| CA | 2402127 A1 | 9/2001 |
| DE | 19833418 A1 | 6/1999 |
| DE | 10011117 A1 | 10/2001 |

* cited by examiner

*Primary Examiner* — Gregory J Toatley
*Assistant Examiner* — Jarreas C Underwood
(74) *Attorney, Agent, or Firm* — Gudrun E. Huckett

(57) ABSTRACT

Disclosed is a method for the contactless measurement of an offset of the functional components of a travel path of a magnetic levitation railway driven by a linear motor with the help of at least one optical triangulation system (10) that can be moved along the travel path. Said method is characterized in that at least two triangulation sensors (12, 14) per measuring instrument for the functional components are moved along the travel path at a determined speed and alternately operate as a measurement sensor and as a reference sensor, i.e. using a radiation source in the ultraviolet, visible, or infrared spectral range, said triangulation sensors (12, 14) being fixedly mounted on a movable support (16) and being geometrically offset. In said method, the diffusely reflected light is absorbed at a specific angle of observation, and the position of the light incident on the measurement sensor is used for determining the offset, said process being carried out at a scanning rate that detects measurement points within a screen of <1.5 mm.

36 Claims, 4 Drawing Sheets

CONTACTLESS MEASUREMENT OF AN OFFSET OF THE FUNCTIONAL COMPONENTS OF A TRAVEL PATH OF A MAGNETIC LEVITATION RAILWAY

BACKGROUND OF THE INVENTION

The invention concerns a device and a method for non-contact measurement of an offset of the functional components of a guideway of a magnetic levitation train driven by a linear motor by means of at least one optical triangulation system that is movable along the guideway.

The invention concerns thus a laser-optical sensor for non-contact detection and measurement of the position of the motor winding in the stator pack, the relative position of the stator packs on the guideway of the magnetic levitation train and/or the vertical or horizontal offsets of the functional components of the magnetic levitation vehicle, namely based on the principle of optical triangulation.

The principle of triangulation uses the effect of light scattering of an illumination beam that impinges perpendicularly onto a surface in that the diffusely reflected light at a certain observation angle is received by an opto-electric sensor element. The position of the light spot that is imaged on the sensor element is evaluated for determining the distance relative to the measured object. The prerequisite is that the object surface is not to 100% planar-reflective (i.e., a mirror) because then the course of light will follow the law of reflection and an observation at an inclined viewing angle is not possible. In general, the scattering behavior of an object depends on its surface properties and the wavelength of the light. Conventionally, in case of triangulation the opto-electronic sensor element (e.g. CCD sensor) is located in the image plane of a receiving objective and is usually positioned at an angle of between 30 and 45° relative to the illumination beam. A displacement of the measuring point on the object in the direction of the illumination beam has the result that, according to the laws of optical imaging, the position of the pixel will move in the observation plane. As a measured value, the position of the pixel is detected.

Systems are known that, by means of optical triangulation by using industrial laser sources, have attempted reference measurements in regard to the precise position of the motor winding in the stator packs of the magnetic levitation train, in particular in connection with the Transrapid. The measurements performed by this method by means of triangulation using industrial laser sources as well as reference measurements of the stator packs/motor winding bottom edge relative to the attachment surfaces of the functional components (e.g. stator support) for the purpose of detection of the motor winding position have not delivered the desired results:

The possible measuring speed as a result of the methodology was only 1-2 km/h.

The measuring precision, as a result of the selection of reference surfaces and the additive effect of the manufacturing tolerances, was too small and was in the range of >4 mm.

The measurements under adverse weather conditions, for example, fog, rain, provided imprecise values.

The vibrations of the measuring vehicle upon passing across the joints of the supports falsified locally the measuring results.

Moreover, the method and the device with respect to the application were limited to the detection of the position of the motor winding and not suitable for further important applications in connection with the Transrapid, such as:

As a quality inspection and approval, inspection and approval measurements of the stator pack position and motor winding position after completed installation on the guideway supports exhibited too small a measuring precision in the range of >4 mm instead of <1 mm.

Periodic control of the position of the stator packs by means of the offset measurement between neighboring stator packs in order to determine possible damages on the attachment because the measuring precision with >4 mm instead of <1 mm was too small.

Control measurement of the offsets and torsion of the lateral guidance rails and/or gliding plane of the guideway supports at the support junction as a result of support settling and/or support torsion. Control measurement of the offsets and torsion of the stator packs at the support junction as a result of support settling and/or support torsion.

Possible integration of the measuring systems directly into the maglev vehicle because the measuring frequency was much too low.

In conclusion, the use of a method and device according to the prior art is:

Uneconomical because of the long time it takes to carry out the measurements and not precise enough.

Only suitable to a limited extent because functional only in good weather conditions.

Unsuitable for covering several required measuring functions of the Transrapid.

For this reason, several devices with different technologies that inspect the system at different times are required for covering all required measuring functions.

SUMMARY OF THE INVENTION

The invention has therefore the object to provide a method as well as a device of the aforementioned kinds that with technically simple means enable to broaden the field of application and also enable additionally to increase greatly the measuring speed as well as measuring precision.

This object is solved for a method of the aforementioned kind according to the invention in that at least two triangulation sensors, fixedly mounted on a movable carrier and geometrically displaced, for each measuring device for the functional components are moved with a determinable speed along the guideway and in this connection alternatingly operate as a measuring sensor and a reference sensor, namely with a radiation source in the ultraviolet, visible or infrared spectral range, wherein the diffusely reflecting light is received at a certain observation angle and the position of the light impinging on the measuring sensor is used for the offset determination, and with a sensing rate that detects measuring points at a grid of <1.5 mm.

The gist of the invention resides in that by means of the use of two optical triangulation systems an inspection regarding undesirable offsets can be performed with a speed and precision that is needed for a high-speed magnetic levitation train such as the Transrapid.

Moreover, it is in this way possible to obtain significant economic advantages by utilization of a single base system for all required applications. Moreover, the application is greatly simplified economically as well as logistically.

A single inspection with appropriate evaluation for position checking of the stator pack and motor winding, as one example of functional components, has thus been made possible.

In general, it is indeed required to perform the inspection of the motor winding position daily. In contrast to this, the inspection of the stator packs, because of redundancy and attachment, may be evaluated every week or every other week. However, in this connection the required resolution of the measurements is higher than for the inspection of the motor winding position and can thus be performed in a targeted fashion in times with advantageous weather conditions.

Moreover, with the aid of the invention it is possible to perform inspections of the stator pack offsets and torsion at the support junction. In this connection, the offset of neighboring stator packs at the support junction is measured and, in case of anomalies, in a simple way a comparative evaluation relative to earlier measurements may be carried out.

Moreover, during the course of train operation as a result of support settling or support torsion offsets of the functional components of the Transrapid system or magnetic levitation train system may occur that surpass the permissible range. They lead in the best case scenario to loss of comfort and must therefore be corrected by means of bearing adjustments.

The measuring device can be used in various applications. For example, an arrangement is possible on an inspection vehicle that moves conventionally on wheels or an arrangement in a section of the magnetic levitation train vehicle itself.

Moreover, it is possible with the invention to provide a non-contact and precise determination of the motor winding position on the stator pack of the magnetic levitation train, a non-contact and precise determination of the relative and absolute position of the stator packs within a furnished guideway support of the magnetic levitation train, a non-contact and precise determination of the relative offsets of the stator packs at the support junctions of the magnetic levitation train guideway in vertical direction and horizontal direction, as well as a non-contact and precise determination of the relative offsets of the lateral guidance rails and the glide planes at the support junctions of the magnetic levitation train guideway in vertical direction and horizontal direction.

According to one embodiment of the invention, it is provided that the functional components are stator packs or lateral guidance rails and glide planes and the carrier together with the measuring installation is moved alongside.

For determining the stator pack position it is moreover advantageous when at least one measuring position is moved alongside the external side of the stator pack undersides.

So that for use of a high-speed magnetic levitation train an inspection in regular intervals, as already mentioned above, is logistically performable at all in a meaningful way, it is advantageous when the moving speed of the measuring installation is at least 100 km/h.

According to an embodiment of the invention, it is provided that measuring is carried out with a measuring distance between sensor and stator pack of less than or equal to 25 cm.

For suppressing or preventing contaminations and environmental effects, it is advantageous when the optical systems that are employed for the measurement are subjected to a flushing air stream.

For reducing sunlight effects on the measuring precision, it is advantageous when the light is optically filtered or is passed through a slit arrangement before the light enters the optical systems.

It is, of course, sufficient to employ only one reflected light spot for determining the offsets. However, it is more advantageous when a light section is used for irradiation of the stator pack/motor winding or stator pack offsets or lateral guidance rail offsets or the screw heads of the screws that connect by means of transverse beams the stator packs with the support elements and only one radiation source is employed and the signal detection is realized with a CCD line detector at an observation angle of 30-45° relative to the direction of excitation.

In regard to the screw heads it should be mentioned that each stator pack is attached to the support structure by means of three frictionally mounted transverse beams and by means of two M-20 screws each. This attachment has very high safety coefficients because computationally four screws of the size M-12 would be sufficient. However, it should be noted that the screws will fail only as a result of material flaws or the loss of prestress. Then bending forces will result that can cause the screw to break. Because up to now no system has been found that can detect safely the presence of screw prestress, redundancies in the form of a dovetail groove are incorporated that are located in the concrete/steel part of the support structure. In this way, it is effected that in case of failure of one or several bolts, the stator pack will vertically drop only by less than 2 mm and will be secured in the redundancy. It is well known, that an uncontrolled drop of a stator pack by more than 4-5 mm constitutes an extremely severe danger because then collision with the vehicle will happen with all the already known consequences.

The redundancy will be explained in the following. There are three fastening axes that each are comprised of transverse beams with two screws M20 each.

When one screw fails on any of the transverse beams, this is not noticeable because the other screws will continue to safely carry the stator pack.

When two screws on different transverse beams fail, there is also nothing noticeable because the other screws will safely carry the stator pack.

When two screws on the central transverse beam fail, there is also nothing noticeable because the other screws will still continue to safely carry the stator pack.

When two screws of an external transverse beam fail, a gap will become noticeable at this transverse beam that is however smaller than required for detection.

Only when screws on a central and on an external transverse beam, or all screws, fail, the stator pack will drop to such an extent that detection is possible. The damaging process however continues, i.e., after failure of the attachment of an external axis and a small stress loss of the other screws, a small gap results that allows for bending stress that, after some time, will gradually damage the screws of neighboring transverse beams of the stator pack in question.

The detection of the screw heads can however be carried out such that only the existence or nonexistence of the head must be detected in order to be able to carry out the required measures earlier than in the case of utilizing redundancies.

Such a detection of these transverse beam screws may make the redundancy for securing the transverse beams entirely unnecessary. Accordingly, by means of this inspection of the screw heads, the magnetic levitation train track can be produced with significantly reduced expenditure because then no redundancy parts with dovetail grooves must be attached to the concrete or steel support structure and also the transverse beams must no longer be provided with a shape matching such a dovetail groove. Outside of the stator parallelepipedal transverse beams may then be used essentially.

A similar advantageous embodiment as noted above is also possible when an optical fiber bundle is used for illumination and detection of the motor winding position at the stator pack for stator pack offsets at the support junction or lateral guidance rail offsets at the support junction or the screw heads of the screws that connect by means of transverse beams the stator packs with the support elements, wherein for all sensor elements only one radiation source is used and the angle between excitation fibers and observation fibers is in the range of 30-45°.

Moreover, advantageously it can be provided to operate the radiation source continuously or in a pulsed fashion.

It is especially advantageous when the signal detection is realized by means of an opto-electrical sensor element wherein the sensor element is a CCD or a position-sensitive diode.

For moving the carrier device or the carrier for the measuring device, different possibilities can be utilized; for example, it is possible to arranged the sensor system on a measuring vehicle or on a section of a magnetic elevation vehicle for routine detection of the motor winding position or the stator pack offsets at the support junction or the lateral guidance rail offsets at the support junction.

Moreover, a further embodiment of the invention provides that with the sensor system the stator pack is illuminated from below and the lateral guidance rail from the side wherein for both functions a single radiation source (optical fiber bundle) can be employed.

In order to be able to work with extreme precision already during construction of the individual support columns and also the guideway parts, it is advantageous when the sensor system is used directly for quality control when furnishing the guideway supports with the functional components for the purpose of measuring the stator position and the motor winding position.

For monitoring the precision during construction of the guideway of the magnetic levitation train vehicle and also for monitoring the precision of the work of the labor personnel, it is advantageous when the sensor system is employed for the purpose of quality control at the construction site after installation of the guideway for measuring the stator pack position, the lateral guidance rail offsets, the glide planes, and the motor winding position, or the screw heads of the screws that by means of transverse beams connect the stator packs with the support elements. Should for certain periods of time the train system not be operated, for example, during maintenance time, it is advantageous when the sensor system is used as a routine measurement before starting train operation again by means of the maintenance vehicle or a magnetic levitation section for measuring the stator pack position, the lateral guidance rail offsets or the motor winding position or the screw heads of the screws that connect by means of transverse beams the stator packs with the support elements.

For the desired measuring speeds it is advantageous when the radiation source is a laser source.

Of course, it is possible to use this method for all magnetic levitation trains with linear motor drive. However, it is advantageous when the magnetic levitation train is a Transrapid.

Further, the object is solved according to the invention for a device of the aforementioned kind in that at least two triangulation sensors, fixedly mounted on a movable carrier and geometrically displaced, for each measuring device for the functional components are moveable with a determinable speed alongside the guideway and, when doing so, by means of a control unit alternatingly operate as a measuring sensor and a reference sensor, and with a radiation source in the ultraviolet, visible or infrared spectral range, wherein the diffusely reflecting light is detected at a certain observation angle and the position of the light impinging on the measuring sensor is determinable for the offset determination, and the measuring points are detectable at a sensing rate of a grid of <1.5 mm.

Since the dependent device claims substantially have the same advantages as the method claims, a detailed description is not needed in this context.

BRIEF DESCRIPTION OF THE DRAWINGS

Further features and advantages of the invention result from the following description of various embodiments as well as the Figures to which reference is being had. It is shown in.

DESCRIPTION OF PREFERRED EMBODIMENTS

Figure 1:
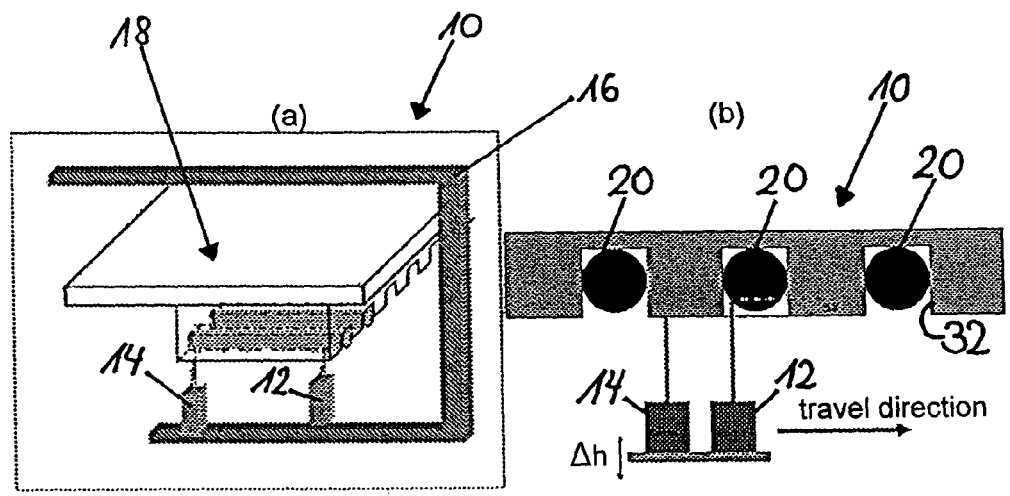
FIG. 1 a system concept of laser triangulation for determination of the LSW position at the magnetic levitation train with alternating measuring sensor and reference sensor for simultaneous measurement at two positions on the stator pack, namely in FIG. 1a as an overall view and in FIG. 1b in a side view.

With the aid of FIGS. 1 to 6 several embodiments of a triangulation system 10 will be explained in more detail. In this connection, same reference numerals always imply same components, at least in principle.

Even though the description applies to all magnetic levitation trains, in this description reference is being had to the magnetic levitation train Transrapid.

When monitoring the position of the motor winding in the stator pack of the magnetic levitation train an inspection of the possible vertical displacements of the stator cable 20 at least at two different positions transversely to the stator pack is to be performed. The speed of the inspection vehicle and thus that of the measurement should be at least 100 km/h. The depth resolution is <1 mm; this corresponds to the measuring precision of the motor winding position in vertical direction. When a spatial resolution of <1 mm is to be achieved, the temporal resolution of the laser triangulation sensor must be >>30 kHz.

The concept of optical triangulation for determining the LSW position (LSW=long stator winding) or the position of the stator cable 20 in connection with the magnetic levitation train is illustrated in FIG. 1.

At least two sensors 12 and 14 are used that alternatingly operate as measuring sensor and reference sensor.

Since the spacing between the individual cable guides 20a across the length of a guideway support is essentially constant, this can be realized simply by a fixedly adjusted offset between the two sensors 12 and 14.

The sensors 12 and 14 are oriented toward the exterior sides of the stator packs so that the position of the cables 20 in the stator pack can be unequivocally determined by means of two laser sensors 12 and 14 without a further sensor having to be installed for reference measurements for the purpose of compensation of mechanical fluctuations of the measuring vehicle or vibrations.

The data of the sensors 12, 14 are read out by an AD converter card (AD=analog-digital) and evaluated in a computer, for example, a notebook, located within the measuring vehicle by means of simply calculating the difference.

Since each stator groove 32 that receives a stator cable 20 is measured, the respective stator grooves 30 can be simply consecutively numbered and measured cable positions can be assumed as absolute values so that each stator cable 20 can be assigned an absolute position in mm.

By means of this evaluation a test record is produced which immediately (promptly) enables to monitor and document the LSW position of each individual cable guide. When presetting an appropriate tolerance, an alarm can be immediately triggered in this way when the position surpasses the preset value. This measuring principle can be used for daily inspection as well as for quality control upon integration of the functional components of the guideway 18, such as stator packs, motor winding etc.

Alternatively, instead of several individual sensors 12, 14 a single sensor element for each stator pack can be utilized. For this purpose, the laser beam is not imaged by means of a cylinder lens optical system 26 as a spot but as a line, onto the stator pack. With suitable objectives it is now possible to image from the focal plane one spot each onto a detector, for example, CCD camera or CCD line detector 24 and in this way the position of the stator cable 20 in the stator pack can be measured according to the above described principle of triangulation.

Figure 2:
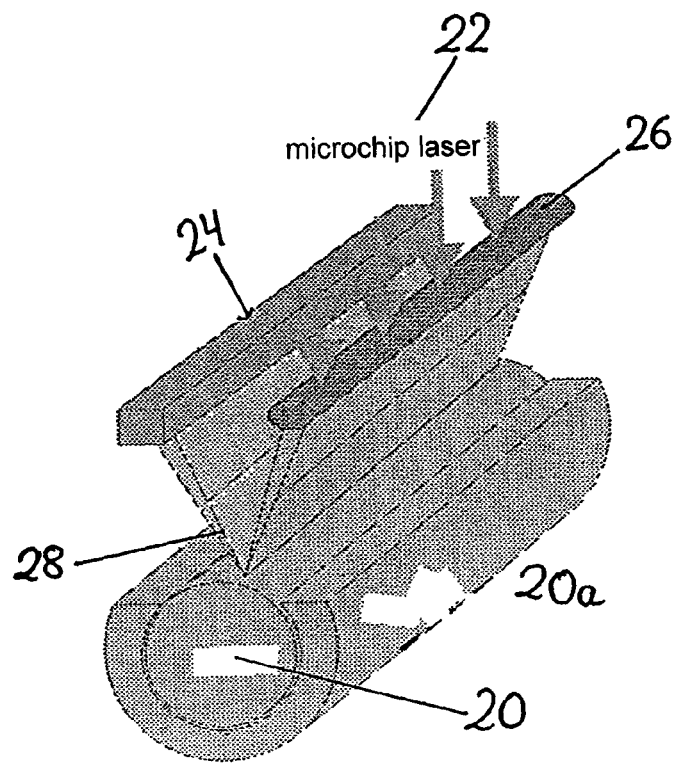
FIG. 2 a laser triangulation system for monitoring the cable position in the stator pack by using light sections and a pulsed microchip laser as a radiation source.

The height resolution is without problem <1 mm and the temporal resolution is at least 30 kHz. The advantage of this arrangement resides in that only one light source 22 is required, a larger number of measuring points can be measured simultaneously, and temporal resolutions of significantly above 20 kHz can be achieved. The principle of this concept is illustrated in FIG. 2.

A further alternative relative to currently known systems resides in the use of optical fiber bundles 30 for dividing the laser light source 22. The individual fiber sensors illuminate each individual positions on the stator pack and positional displacements are then detected by means of position sensitive detectors (PSD). Since in this connection analog signals are used, achieving spatial resolutions of <1 mm is also not a technical problem.

An advantage of the use of microchip lasers 22 relative to conventionally employed diode lasers is the comparatively significantly higher output power, the pulsed radiation, and the use of wavelength in the infrared spectral range that enables thus relatively simply a suppression of daylight in signal recording.

Figure 3:
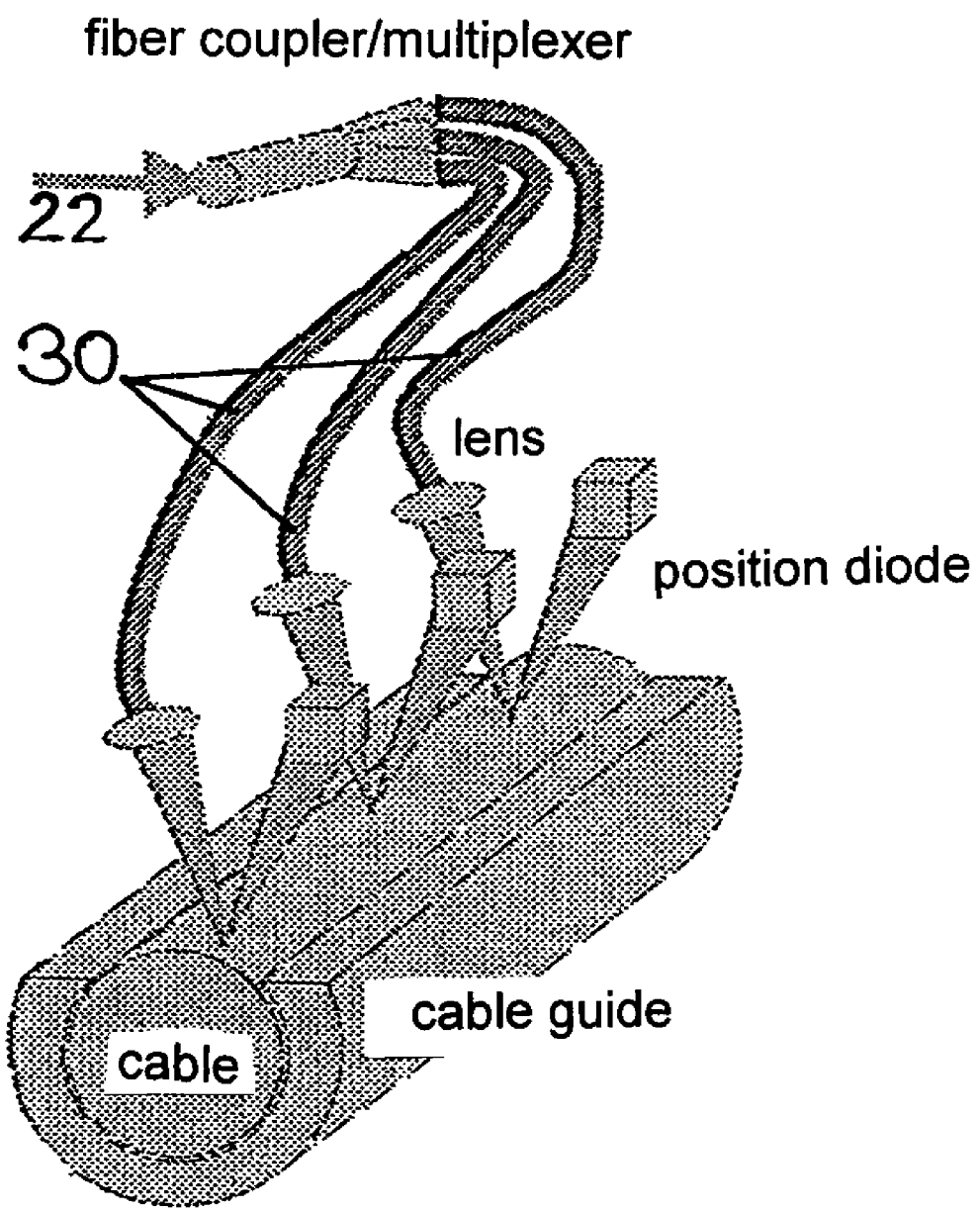
FIG. 3 a fiber-coupled laser triangulation system for monitoring the cable position in the stator pack by using optical fiber bundles and pulsed microchip lasers as radiation source.

The principle of this arrangement is illustrated in FIG. 3. By using optical fibers 30, the system enables to supply the stator packs of the linear motors of the Transrapid that are integrated on both sides of the guideway with a single laser light source 22.

The precision of the optical triangulation relative to moving measured objects depends significantly on the sensing rate of the employed sensors 12, 14. In this application a minimum speed of 100 km/h should be achieved. For a speed of the measuring vehicle of, for example, 120 km/h, a 20 kHz sensing rate results in recording of measuring points in a grid of 1.7 mm. The typical measuring distance between sensors 12, 14 and measuring object is 15 cm.

A further problem field solved by means of the inventive method especially with respect to practical application concerns the elimination of the effects of rain or fog on the measuring precision of the triangulation. Normally, a drastic change for the worse of the recorded measuring signals is observed. The background signal, for example, the backscatter signal of the stator pack surface is significantly more noisy in comparison to a dry surface and the two cable positions, signal and reference, can no longer be exactly resolved. An explanation is the additional scattering of laser light on the water droplets in the air along the travel path between surface and sensor element.

According to the invention, this can be solved in various ways and by their combination as follows:

Use of a laser wavelength that is shifted to infrared spectral range; here the proportion of Mie and Rayleigh scattering in comparison to the employed laser radiation at 650 nm is significantly reduced;

Reduction of the spacing of the laser+ to the measuring surface; then fewer scattering processes with water droplets are possible;

Use of a system with increased sensing rate so that a greater number of measuring points can be averaged and therefore the scattered signals no longer carry such a weight.

The subsequent scattering tests under sprayed mist conditions with different wavelengths 650 nm, 1,064 nm, and 1,550 nm show that for infrared-shifted wavelength an improvement of the measuring results by up to 20% can be achieved.

For the practice-relevant realization of the measuring method in case of the Transrapid, optimized measuring distances and a high sensing rate have been employed successfully for solving the problem.

The effect of the obtainable measuring precision as a function of mechanical vibrations is also of great importance in connection with applications in the Transrapid. The developed test arrangement with at least two displaced sensors according to FIG. 1 shows no effect for induced vibrations.

Figure 4:
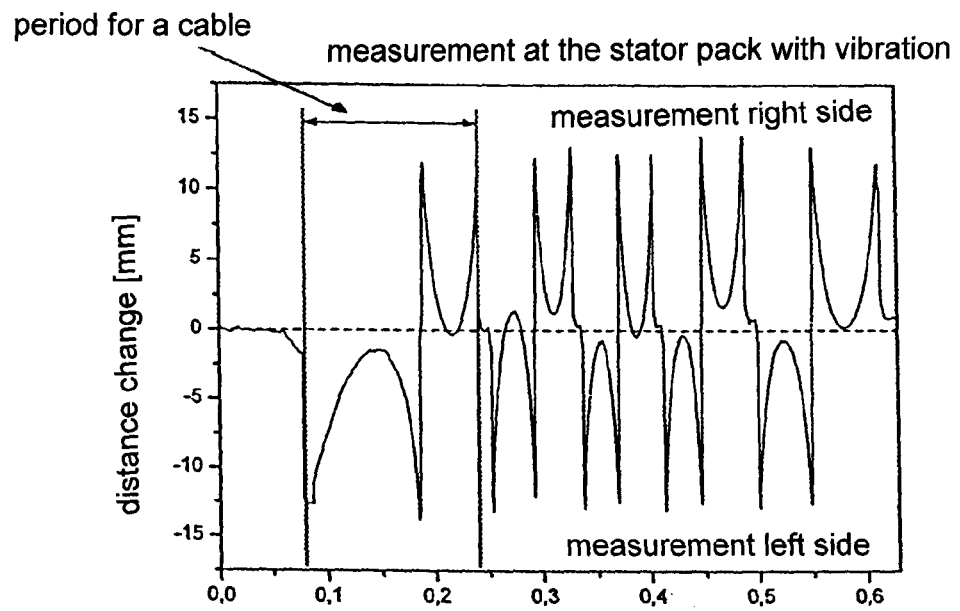
FIG. 4 a diagram for illustrating the compensation of shocks/vibrations by alternating data recording of measuring sensor and reference sensor according to the arrangement of FIG. 1 for 20 kHz laser triangulation sensors wherein five cable windings are shown.

FIG. 4 shows measuring data for tests for measuring the motor winding position at the stator pack when artificially vibrations are induced in the stator pack. Even under these conditions the absolute measuring precision is <0.1 mm. Therefore, cable displacements for the cable guides 20a can be identified unequivocally.

A further important aspect for practical applications of this measuring technology is the possible effect of directly impinging sunlight onto the laser triangulation sensors 12 and 14.

When sunlight is also imaged on the sensor element 12, 14, it generates on the CCD line detector 24 also a measuring signal (background) which possibly is significantly greater than the scattered light signal induced by the laser 22. In this case, the measurement of surface properties, i.e., the determination of the LSW position, is normally no longer possible.

This background can be significantly reduced by using narrow band interference filters that have only transparency, for example, at the laser wavelength of 650 nm, or by using suitable polarization filters. Still, a direct irradiation of the sensor elements 12, 14 with sunlight perpendicularly to the sensor surface should be avoided even in case of the presence of the aforementioned filters. The use of a cylinder-shaped aperture 26 on the sensor 12, 14 reduces further the sunlight scattering effects.

When the optical triangulation sensors according to FIG. 1, 2 or 3 are positioned on the underside of the stator pack, as can be done in practical application in the Transrapid, a direct irradiation of the sensors with sunlight is prevented also.

Figure 5:
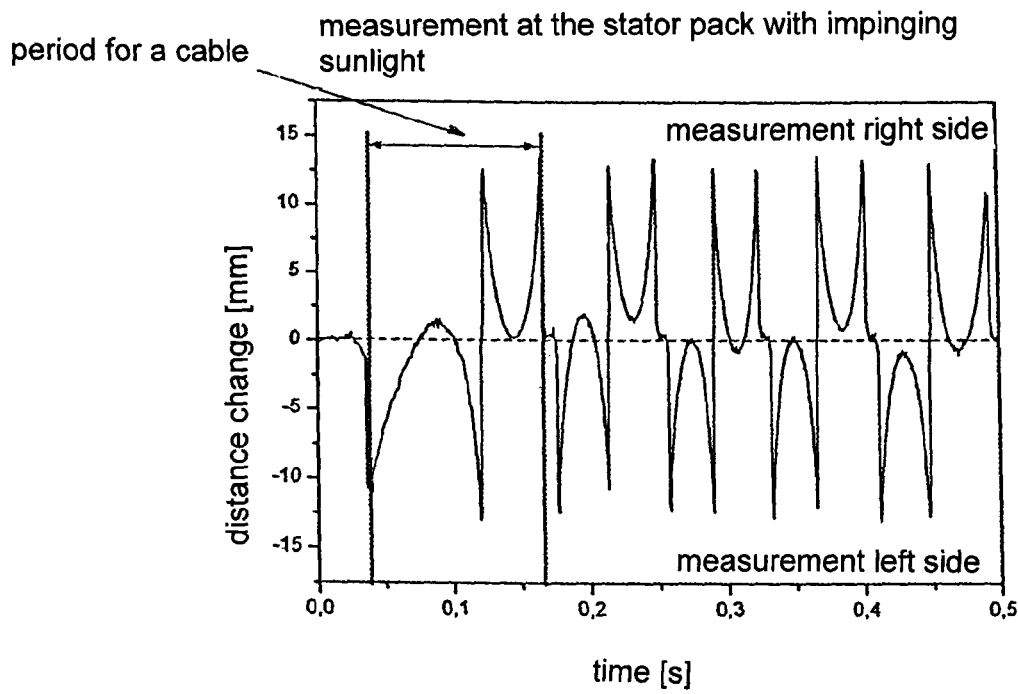
FIG. 5 a diagram for illustration of laser triangulation measurements under extreme sunlight for five cable guides according to an arrangement of FIG. 1 with 20 kHz elements.

FIG. 5 shows triangulation measurements on the stator pack under sunlight irradiation. Minimal geometric displacements, <1 mm, of the motor winding position can be identified even under these conditions without problem.

Figure 6A:
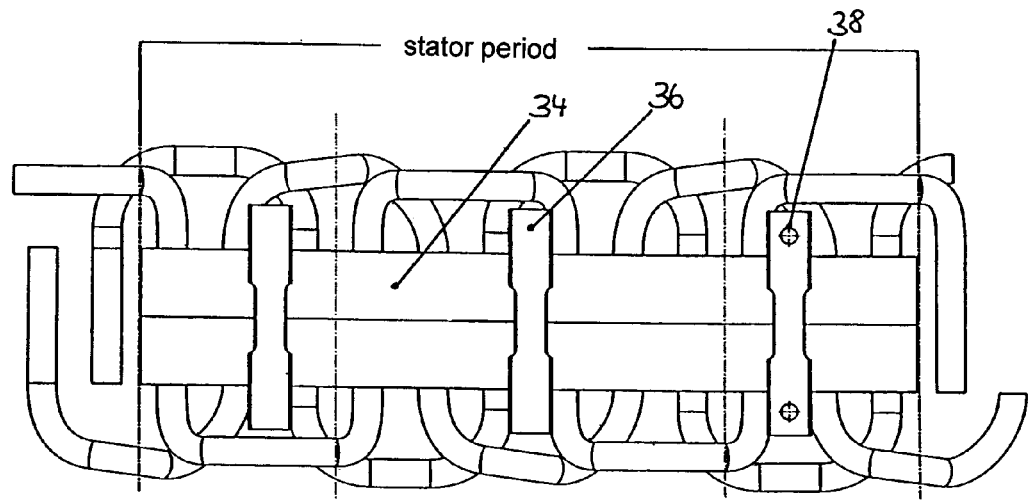
FIG. 6a-c: a view of the underside, a side view, as well as a perspective view of a stator pack as it is currently still being used.
Figure 6B:
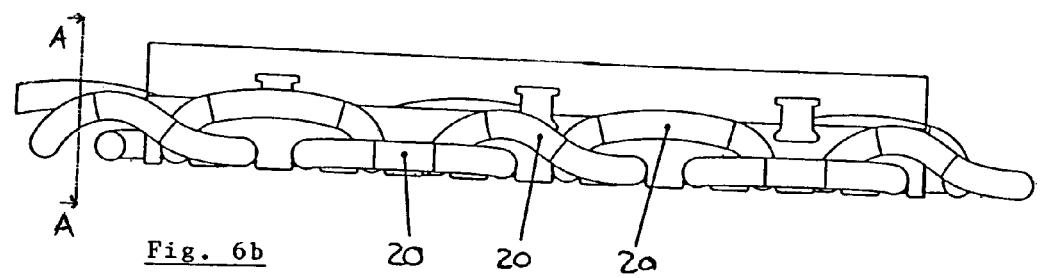
Figure 6C:
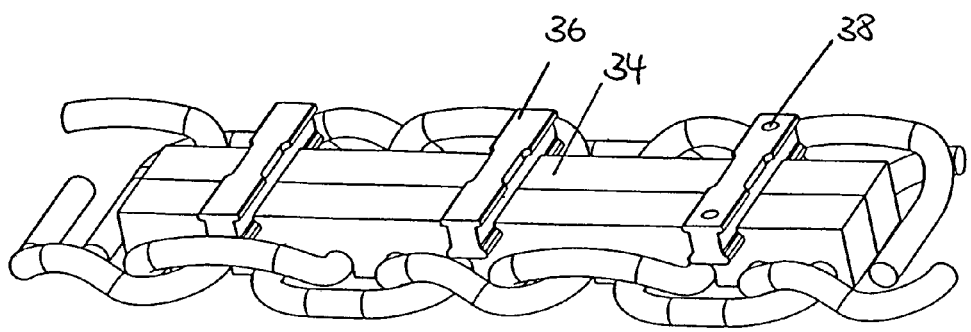

In the FIGS. 6a to 6c different views of a single stator pack 34 are illustrated. In this connection, each stator pack 34 in the illustrated stator pack 34 is secured by means of transverse beams 36. These transverse beams 36 are connected by means of bolts to the lower area of the guideway, however currently by use of an additional redundancy. This redundancy resides in that in the lower support structure area of the guideway steel parts with the dovetail-shaped grooves are attached that are engaged by the free longitudinal sides of the transverse beams 36 that are also embodied with a dovetail shape (negative). In this connection, the redundancy resides in that the dovetail grooves have such a height that, upon breakage of one screw or both screws of a transverse beam 36, the transverse beam 36 can maximally drop by 2 mm and the beam is still secured in the redundancy part with formed groove that is connected to the concrete/steel support structure.

For safety reasons, the attachment for the stator packs 34 is currently comprised of three transverse beams 36 each having two M-20 screws that are introduced into the concrete/steel support structure of the guideway.

With respect to the screw heads, it should be mentioned that each stator pack 34 is attached by means of three frictionally connected transverse beams 36 and two M-20 screws, respectively, to the support structure. This attachment has very high safety coefficients because, computationally, four screws of the size M-12 would be sufficient. However, it should be mentioned that the screws will only fail as a result of material flaws or the loss of prestress. In this case, bending forces are produced that may result in breaking of the screw. Because up to now no system has been found that detect safely the presence of screw prestress, redundancies in the form of a dovetail groove are incorporated that are located within the concrete/steel part of the support structure. In this way, it is effected that in case of failure of one or several bolts, the stator pack will drop vertically only by less than 2 mm and is secured in the redundancy. It is well known that an uncontrolled drop of the stator pack by 4-5 mm constitutes extremely severe danger because then collision with the vehicle with all the already known consequences will occur.

The detection of the screw heads can however be realized such that only the existence or nonexistence of the head must be detected in order to be able to undertake the required measures.

Such a detection of these transverse beam screws can eliminate completely the redundancy for securing the transverse beam. This means that by means of this inspection of the screw heads the levitation train track can be produced with significantly reduced expenditure because no redundant parts with dovetail grooves must be connected to the concrete/steel support structure and also the transverse beams require no longer a shape matching these dovetail grooves. Essentially, outside of the stator body parallelepipedal transverse beams can then be used.

The optical triangulation with the described arrangement according to FIGS. 1-3 can be used successfully for the non-contact determination of the position of the motor winding position at the stator pack under the following conditions:

The triangulation sensors 12, 14 should have, if possible, a sensing rate of at least 20 kHz so that a speed of the measuring vehicle of >110 km/h can be ensured and the achieved precision of the depth resolution is better than 0.2 mm. By using pulsed microchip lasers 22 according to the arrangement of FIG. 2 or 3 significantly higher sensing rates can be achieved.

When the measuring distance between sensor-stator pack is <15 cm, effects of water vapor, rain and sprayed mist are tolerable; the achieved precision of depth resolution is <0.35 mm.

Deposition of contaminations on the optical systems (windows) of the sensors 12, 14 can be cleaned by suitably shaped flushing streams of ambient air during train operation.

Sunlight does not affect the measuring precision of the described arrangement, in particular, when interference and/or polarization filters are used in front of the sensors 12, 14. A cylinder-shaped aperture 26 in front of the sensors 12, 14 prevents additionally pick-up of scattered sunlight.

The inventive displaced arrangement of at least 2 sensors 12, 14 that are functioning alternatingly as measuring sensor and reference sensor, serves very efficiently for compensating mechanical disruptions/vibrations.

The system arrangements illustrated in FIGS. 1-3 can be mounted on a service vehicle and/or a section of the Transrapid vehicle so that the motor winding position can be measured routinely.

The raw data can be read by means of an AD converter card into a notebook PC, can be processed therein appropriately, and the absolute determined cable positions for the left and right sides of the stator pack are subsequently saved in a file that serves as a test record. The respective cable guides or stator grooves 32 are numbered consecutively so that local deviations of the cable position of the corresponding cable location in the stator pack can be assigned. The recorded data serve as a documentation of the produced quality of a stator pack furnished with the motor winding already immediately after production as well as for routine monitoring of the Transrapid track in connection with a service vehicle.

LIST OF REFERENCE NUMERALS 10 triangulation system
12 1st triangulation sensor/sensor
14 2nd triangulation sensor/sensor
16 carrier
18 guideway
20 stator/stator cable
20a cable guide
22 radiation source
24 CCD line detector
26 optical system
28 light section
30 optical fiber bundle
32 stator groove
34 stator pack
36 transverse beam
38 screw bore

What is claimed is:

1. Method for non-contact measurement of an offset of the functional components of a guideway of a magnetic levitation train driven by a linear motor by at least one optical triangulation system movable alongside the guideway, comprising the steps of:

providing a sensor system of at least two triangulation sensors, fixedly mounted on a movable carrier and geometrically displaced, for each measuring device for the functional components;

moving at a determinable speed the at least two triangulation sensors along the guideway and, when doing so, operating the at least two triangulation sensors alternatingly as a measuring sensor and as a reference sensor with a radiation source in the ultraviolet, visible or infrared spectral range, wherein the diffusely reflected light is detected at a certain observation angle and the position of the light impinging on the measuring sensor is used for offset determination, and a sensing rate for detecting the measuring points in a grid of <1.5 mm is used.

2. Method according to claim 1, wherein the functional components are stator packs or lateral guidance rails and the carrier together with the sensor system is moved alongside the stator packs or lateral guidance rails.

3. Method according to claim 1, wherein at least one measuring position is moved alongside the external side of the stator pack.

4. Method according to claim 1, wherein the moving speed of the carrier is at least 100 km/h.

5. Method according to claim 1, wherein measuring is carried out with a measuring distance between sensor and stator pack of less than or equal to 25 cm.

6. Method according to claim 1, wherein optical systems of the sensor system that are used for measurement are subjected to a flushing air stream.

7. Method according to claim 1, the light is optically filtered or is passed through a slit arrangement before entering optical systems of the sensor system that are used for measurement.

8. Method according to claim 1, wherein a light section is used for irradiation of the stator pack/motor winding or the screw heads of the screws that connect by transverse beams the stator packs with the support elements, or stator pack offsets or lateral guidance rail offsets and only one radiation source is employed, wherein the signal detection is realized by a CCD line detector at an observation angle of 30-45° relative to the direction of excitation.

9. Method according to claim 1, wherein an optical fiber bundle is used for illumination and detection of the motor winding position at the stator pack for stator pack offsets on the support junction or lateral guidance rail offsets at the support junction or the screw heads of the screws that connect by transverse beams the stator packs with the support elements, wherein for all sensor elements only one radiation source is used and the angle between excitation fibers and observation fibers is in the range of 30-45°.

10. Method according to claim 1, wherein the radiation source operates continuously or in a pulsed fashion.

11. Method according to claim 1, wherein the signal detection is realized by an opto-electrical sensor element, wherein the sensor element is a CCD or a position-sensitive diode.

12. Method according to claim 1, wherein the sensor system is arranged on a measuring vehicle or a section of a magnetic levitation vehicle for routine detection of the motor winding position or the stator pack offsets at the support junction or the lateral guidance rail offsets at the support junction or the screw heads of the screws that connect by transverse beams the stator packs with the support elements.

13. Method according to claim 1, wherein the sensor system illuminates the stator pack from below and the lateral guidance rails from the side.

14. Method according to claim 1, wherein the sensor system for measuring the stator position and the motor winding position is used for quality control immediately upon furnishing of the guideway supports with the functional components.

15. Method according to claim 1, wherein the sensor system is used for measuring the stator pack position, the lateral guidance rail offsets and the motor winding position or the screw heads of the screws that connect by transverse beams the stator packs to the support elements for quality control after erection of the guideway at the construction site.

16. Method according to claim 1, wherein the sensor system is used for measuring the stator pack position, the lateral guidance rail offsets, and the detection of the screw heads of the screws that connect by transverse beams the stator packs with the support elements, the motor winding position as a routine measurement during shutdown periods by a service vehicle or a magnetic levitation section.

17. Method according to claim 1, wherein the radiation source is a laser source.

18. Method according to claim 1, wherein the magnetic levitation train is a Transrapid.

19. Device for non-contact measurement of an offset of the functional components of a guideway of a magnetic levitation train driven by a linear motor by at least one optical triangulation system (10) movable alongside the guideway, comprising a sensor system of at least two triangulations sensors (12, 14), fixedly mounted on a movable carrier (16) and geometrically displaced, for each measuring device for the functional components that are movable with a determinable speed along the guideway (18) and are operated by a control unit alternatingly as a measuring sensor and as a reference sensor, and further comprising a radiation source (22) in the ultraviolet, visible or infrared spectral range, wherein the diffusely reflected light is detected under a certain observation angle and the position of the light impinging on the measuring sensor (12, 14) is determinable for offset determination, wherein a sensing rate is used so that the measuring points are detectable in a grid of <1.5 mm.

20. Device according to claim 19, wherein the functional components are stator packs or lateral guidance rails and the carrier (16) with the sensor system is movable alongside.

21. Device according to claim 19, wherein at least one measuring position is movable alongside the external side of the stator packs.

22. Device according to claim 19, wherein a moving speed of the carrier is at least 100 km/h.

23. Device according to claim 19, wherein the measuring spacing between sensor (12, 14) and stator pack is smaller or identical to 25 cm.

24. Device according to claim 19, wherein optical systems (26) of the sensor system that are used for measuring can be subjected to a flushing air stream.

25. Device according to claim 19, wherein the light is optically filtered or is passed through a slit arrangement before entering optical systems (26) of the sensor system that are used for measuring.

26. Device according to claim 19, wherein a light section (28) can be radiated by only one radiation source for irradiation of the stator pack/motor winding or stator pack offsets or lateral guidance rail offsets or the screw heads of the screws that connect by transverse beams (36) the stator packs (34) to the support elements, and a CCD line detector (24) is provided that detects signals at an observation angle of 30°-45° relative to the direction of excitation.

27. Device according to claim 19, wherein an optical fiber bundle (30) is arranged for illumination and detection of the motor winding position at the stator pack or stator pack offsets at the support junction or lateral guidance rail offsets at the support junction or the screw heads of the screws that connect by transverse beams (36) the stator packs (34) to the support elements, wherein for all sensor elements only one radiation source (22) exists and the angle between excitation fibers and observation fibers is in the range of 30°-45°.

28. Device according to claim 19, wherein the radiation source (22) operates continuously or in a pulsed fashion.

29. Device according to claim 19, wherein signal detection is performed by an opto-electric sensor element wherein the sensor element (12, 14) is a CCD or a position-sensitive diode.

30. Device according to claim 19, wherein the sensor system (10) is arranged on a measuring vehicle or a section of a magnetic levitation vehicle for routine detection of the motor winding position or stator pack offsets at the support junction for the lateral guidance rail offsets at the support junction or the screw heads of the screws that connect by transverse beams (36) the stator packs (34) to the support elements.

31. Device according to claim 19, wherein the sensor system (10) illuminates the stator pack (34) from below and the lateral guidance rails from the side.

32. Device according to claim 19, wherein the sensor system (10) for measuring the stator position and the motor winding position are usable for quality control immediately at the time of furnishing the guideway supports with the functional components.

33. Device according to claim 19, wherein the sensor system (10) for measuring the stator pack position, lateral guidance rail offsets and the motor winding position is usable at the construction site for quality control after erection of the guideway of the magnetic levitation train.

34. Device according to claim 19, wherein the sensor system (10) for measuring the stator pack position, lateral guidance rail offsets and the motor winding position is usable as routine measurement during shutdown periods by means of the service vehicle or a magnetic levitation section.

35. Device according to claim 19, the radiation source (22) is a laser source.

36. Device according to claim 19, wherein the magnetic levitation train is a Transrapid.

* * * * *